(12) United States Patent
Silverbrook et al.

(10) Patent No.: US 7,173,729 B2
(45) Date of Patent: Feb. 6, 2007

(54) EFFECTS MODULE FOR A CAMERA AND PRINTER ASSEMBLY

(75) Inventors: Kia Silverbrook, Balmain (AU); Simon Robert Walmsley, Balmain (AU); Paul Lapstun, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 11/329,162

(22) Filed: Jan. 11, 2006

(65) Prior Publication Data

US 2006/0109509 A1   May 25, 2006

Related U.S. Application Data

(60) Continuation of application No. 10/636,282, filed on Aug. 8, 2003, now Pat. No. 7,068,394, which is a division of application No. 09/575,121, filed on May 23, 2000, now Pat. No. 6,956,669.

(30) Foreign Application Priority Data

May 25, 1999 (AU) .................................... PQ0560

(51) Int. Cl.
*G06K 13/00* (2006.01)
*H04N 1/40* (2006.01)
*B41J 3/36* (2006.01)

(52) U.S. Cl. .................. 358/1.15; 358/442; 358/473; 700/100; 347/109

(58) Field of Classification Search ................ 358/1.9, 358/3.27, 1.15, 1.18, 442–444, 447, 448, 358/473, 296; 347/108, 109; 361/679, 728–730; 710/100
See application file for complete search history.

(56) References Cited

U.S. PATENT DOCUMENTS

| | | | |
|---|---|---|---|
| 5,432,896 A | 7/1995 | Hwong et al. | |
| 5,748,326 A | 5/1998 | Thompson-Bell et al. | |
| 5,859,710 A | 1/1999 | Hannah | |
| 6,260,087 B1 | 7/2001 | Chang | |
| 6,930,793 B1 | 8/2005 | Namizuka et al. | |

FOREIGN PATENT DOCUMENTS

| | | |
|---|---|---|
| AU | 55415/98 A | 8/1998 |
| EP | 0912035 A | 4/1999 |
| EP | 924647 A2 | 6/1999 |
| GB | 2327838 A | 2/1999 |
| WO | WO 99/04368 A1 | 1/1999 |

*Primary Examiner*—Scott A. Rogers

(57) ABSTRACT

An effects module for a modular camera and printer assembly includes a body that houses processing circuitry. The processing circuitry includes a central processing core. Memory circuitry is connected to the core. User interface circuitry is connected to the core to facilitate operation of the module. Module interface circuitry permits communication between the central processing core and other modules of the camera and printer assembly. A connector is arranged on the body and is connected to the module interface circuitry to permit the effects module to be connected to said other modules.

7 Claims, 11 Drawing Sheets

EFFECTS MODULE FOR A CAMERA AND PRINTER ASSEMBLY

CROSS REFERENCE TO RELATED APPLICATIONS

This is a Continuation application of U.S. Ser. No. 10/636,282 filed on Aug. 8, 2003 now U.S. Pat. No. 7,068,394, which is a Divisional application of U.S. Ser. No. 09/575,121 filed on May 23, 2000, now issued U.S. Pat. No. 6,956,669, the entire contents of which are herein incorporated by reference.

FIELD OF THE INVENTION

The invention relates to a compact printer system able to print full-color, business card size documents from a device about the size of a pen. The system includes various hot-connectable modules that provide a range of functions. In particular the invention relates to an effects processor for an effects module.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Our Title |
| --- | --- |
| 09/575,182 | Compact Color Printer Module |
| 09/575,173 | Modular Compact Printer System |
| 09/575,194 | Nozzle Capping Mechanism |
| 09/575,136 | Ink Cartridge for Compact Printer System |
| 09/575,119 | Controller for Printer Module |
| 09/575,135 | Camera Module for Compact Printer System |
| 09/575,157 | Image Processor for Camera Module |
| 09/575,166 | Memory Module for Compact Printer System |
| 09/575,134 | Effects Module for Compact Printer System |
| 09/575,137 | Timer Module for Compact Printer System |
| 09/575,167 | Color Conversion Method for Compact Printer System |
| 09/575,120 | Method and Apparatus of Dithering |
| 09/575,122 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Our Title |
| --- | --- |
| 09/575,152 | Fluidic seal for an ink jet nozzle assembly |
| 09/575,141 | Ink jet printhead having a moving nozzle with an externally arranged actuator |
| 09/575,125 | Method of manufacture of an ink jet printhead having a moving nozzle with an externally arranged actuator |
| 09/575,176 | Ink jet printhead nozzle array |
| 09/575,147 | Nozzle guard for an ink jet printhead |

SUMMARY OF THE INVENTION

1. In one form, the invention resides in a compact printer system having an effects processor for an effects module that applies effects to stored images, said effects processor comprising:
   a central processing unit;
   a fast integer multiplication unit;
   program memory comprises VARK language software associated with said central processing unit, said program memory storing program steps for execution by said central processing unit to apply effects to said stored images;
   an interface unit communicating with components of said effects unit; and
   a serial bus interface for reception of stored images and transmission of resultant images.

Further features of the invention will be evident from the following description.

BRIEF DESCRIPTION OF THE DRAWINGS

In order to assist with describing preferred embodiments of the invention, reference will be made to the following figures in which.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business card-sized sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
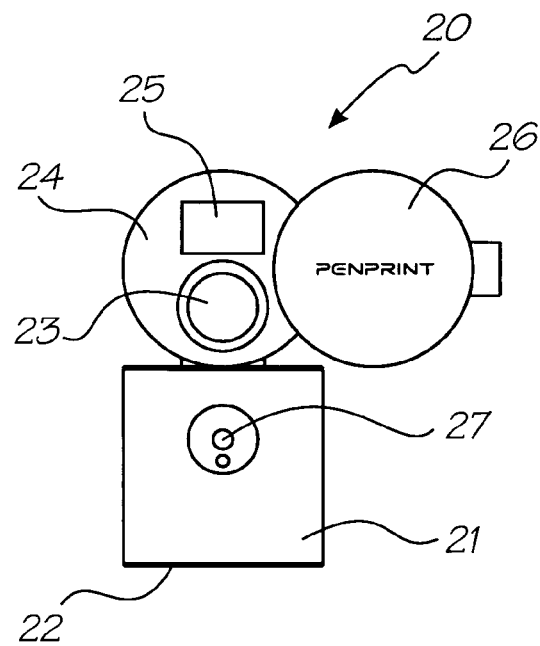
FIG. 2 is a camera module.
Figure 3:
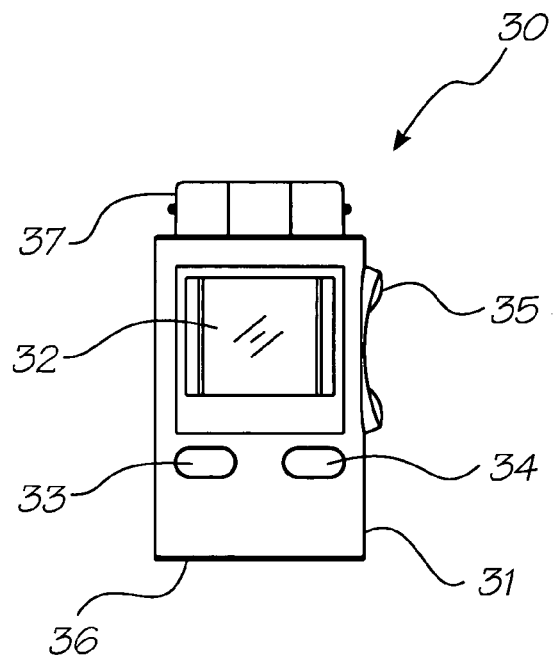
FIG. 3 is a memory module.
Figure 6:
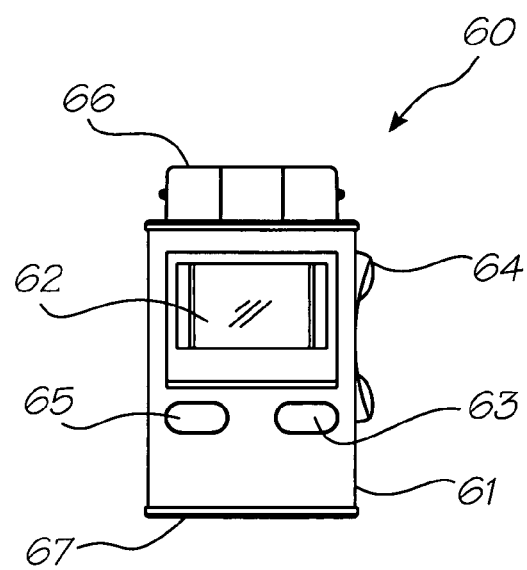
FIG. 6 is a timer module.
Figure 7:
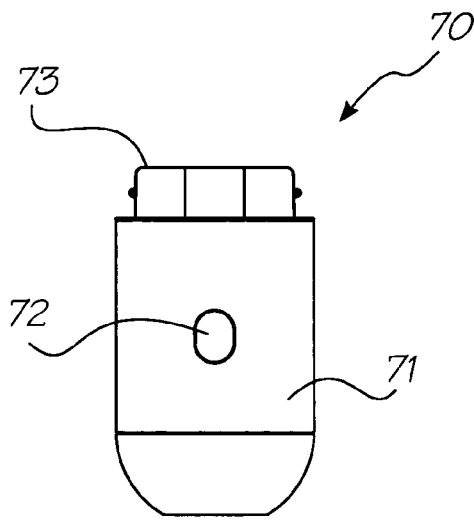
FIG. 7 is a laser module.

Compact printer modules can be grouped into three types:
image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
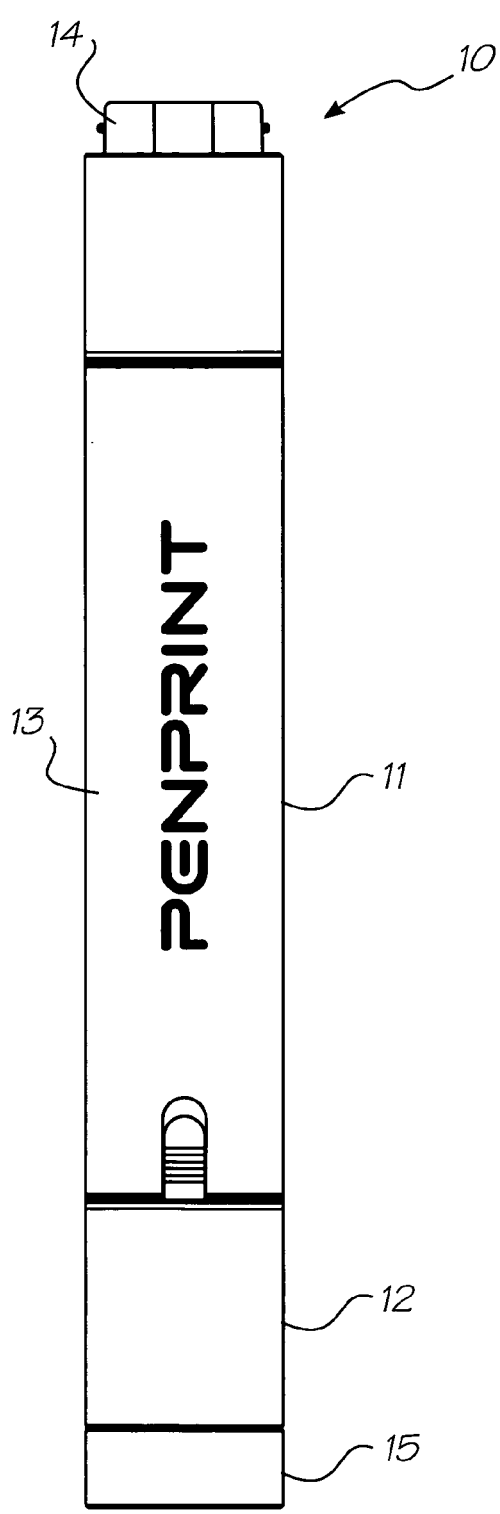
FIG. 1 is a printer module.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

Figure 4:
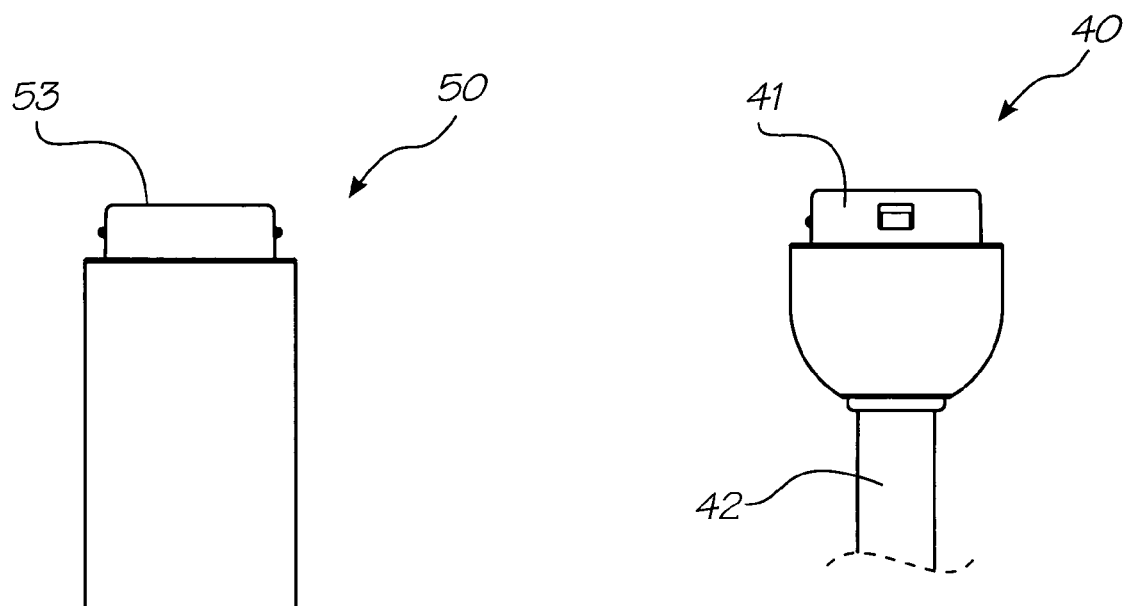
FIG. 4 is a communication module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

Figure 5:
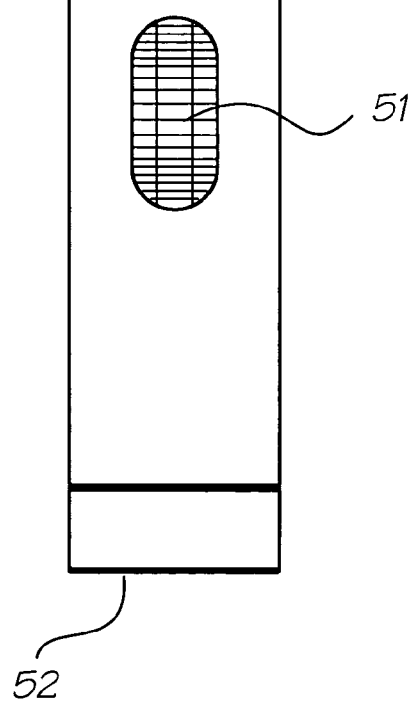
FIG. 5 is a flash module.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
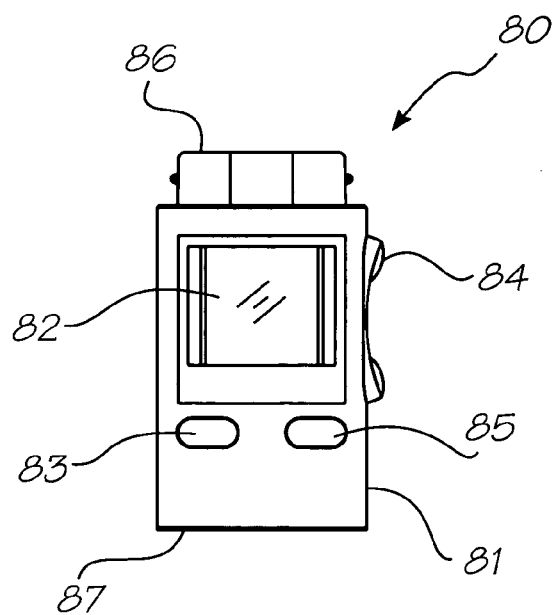
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
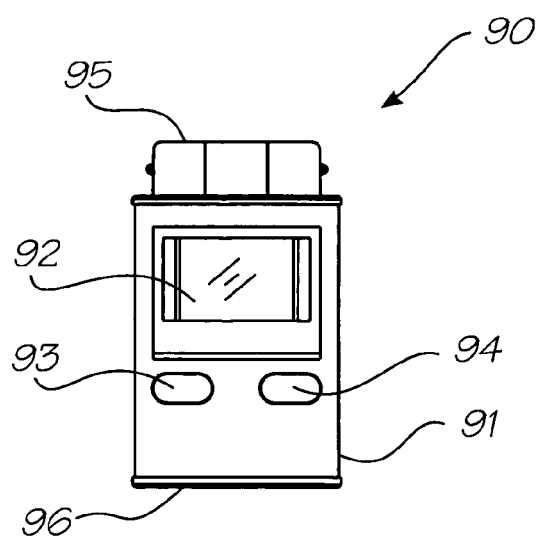
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
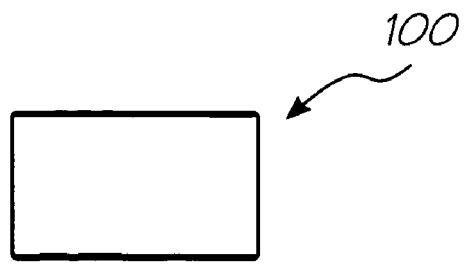
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
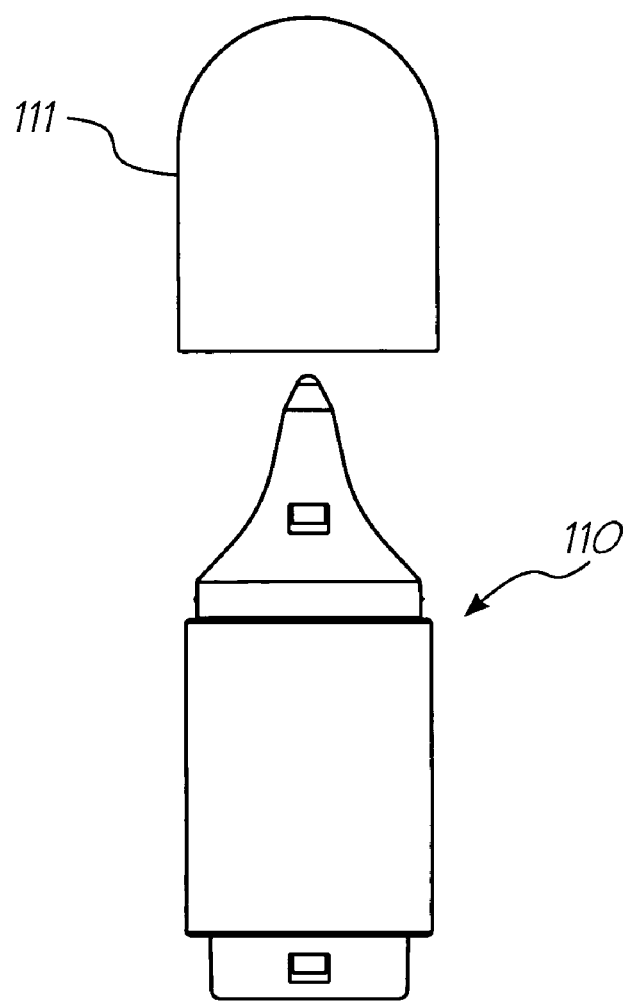
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
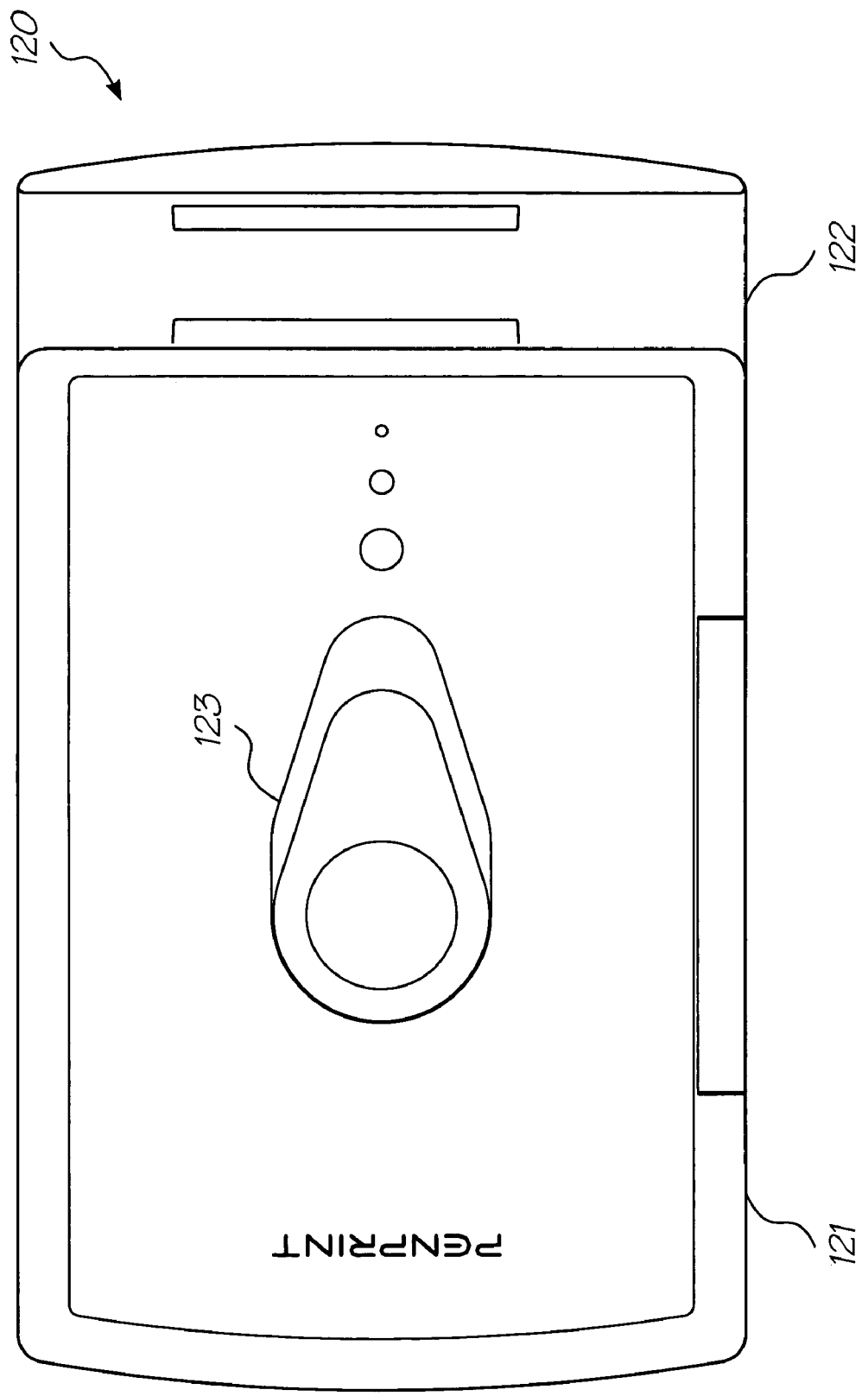
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
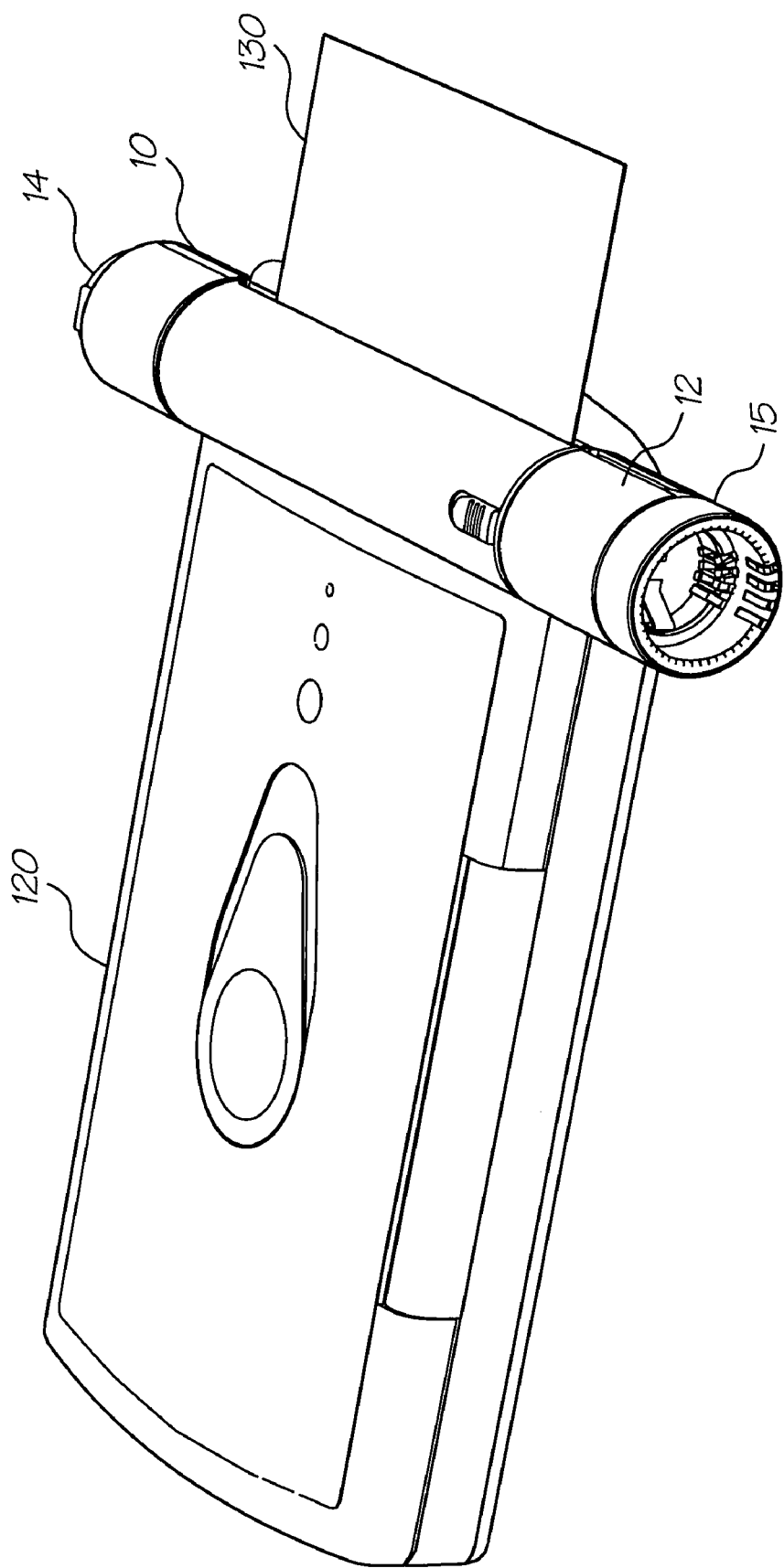
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
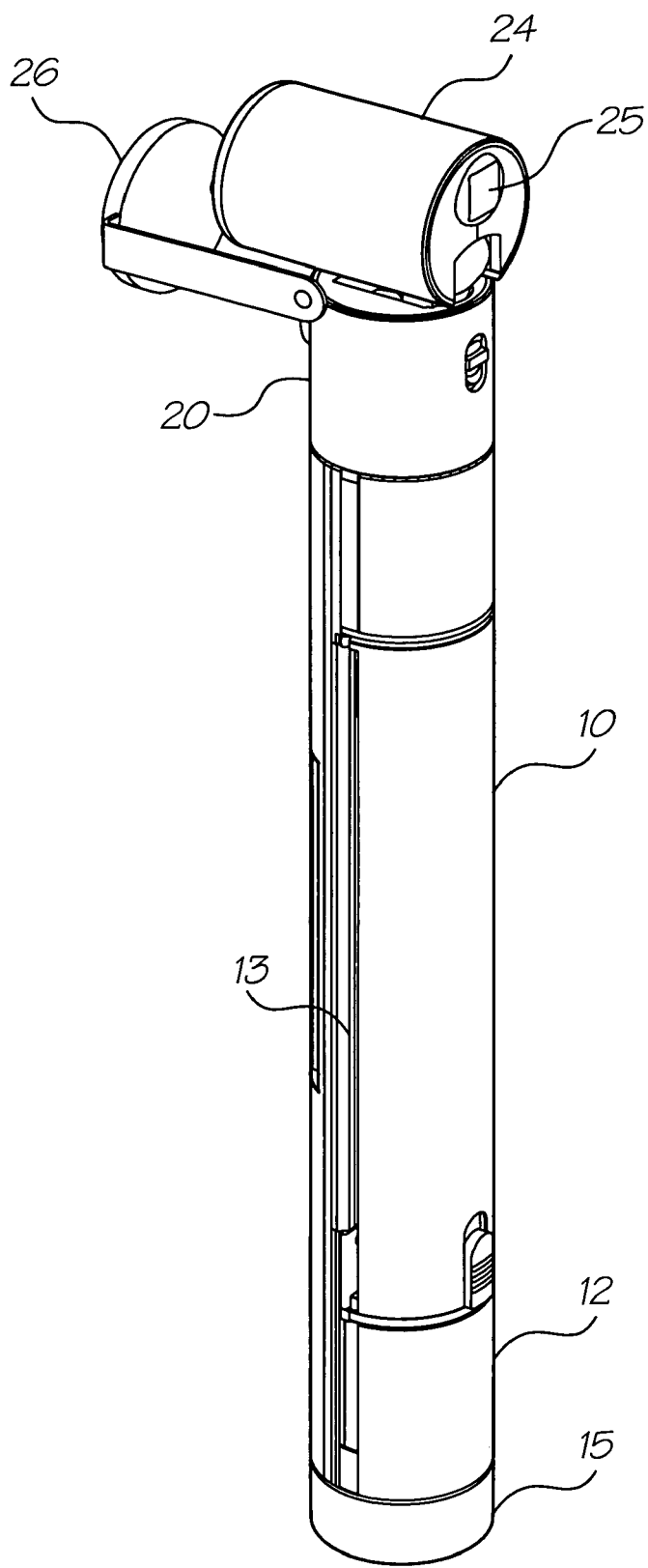
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
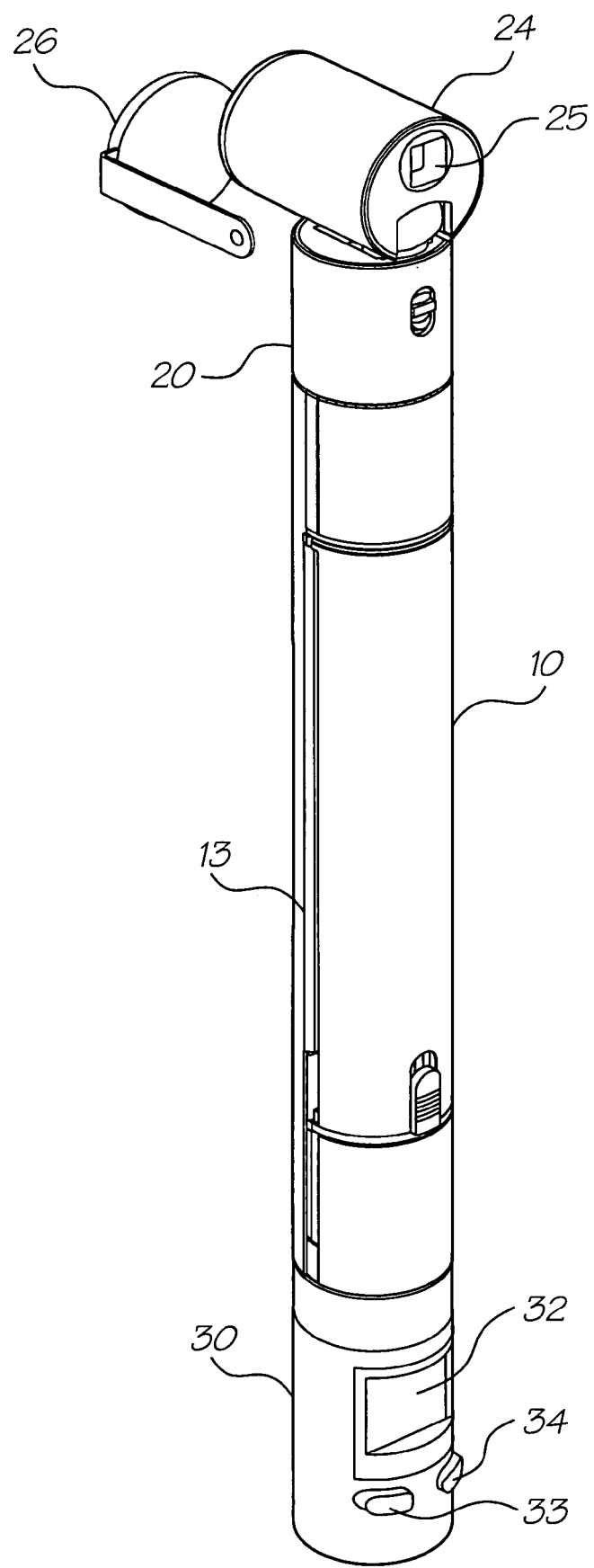
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
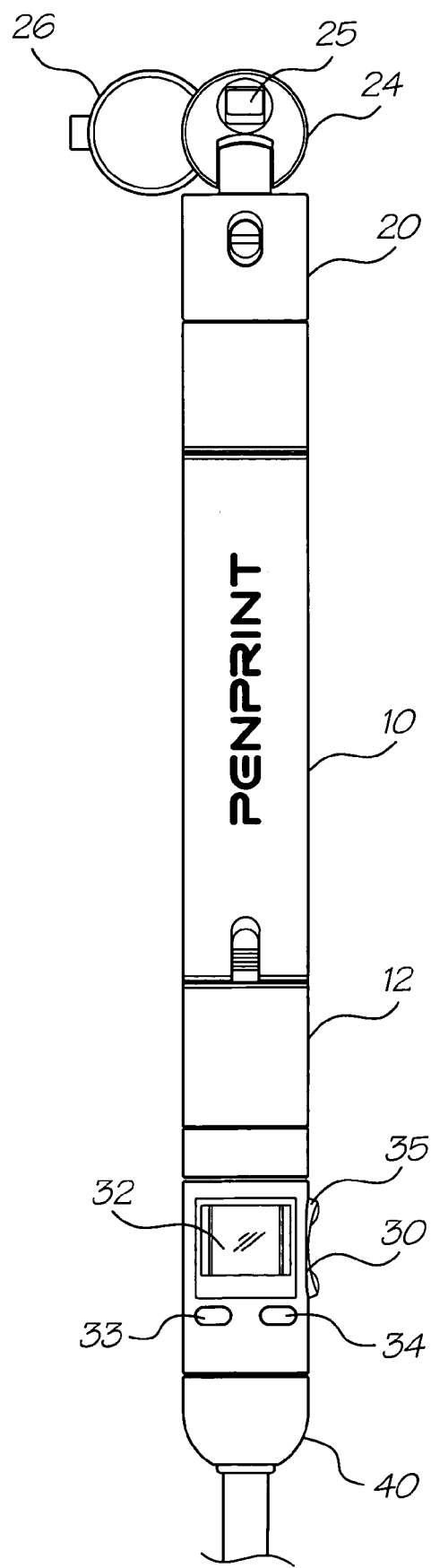
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space lo to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
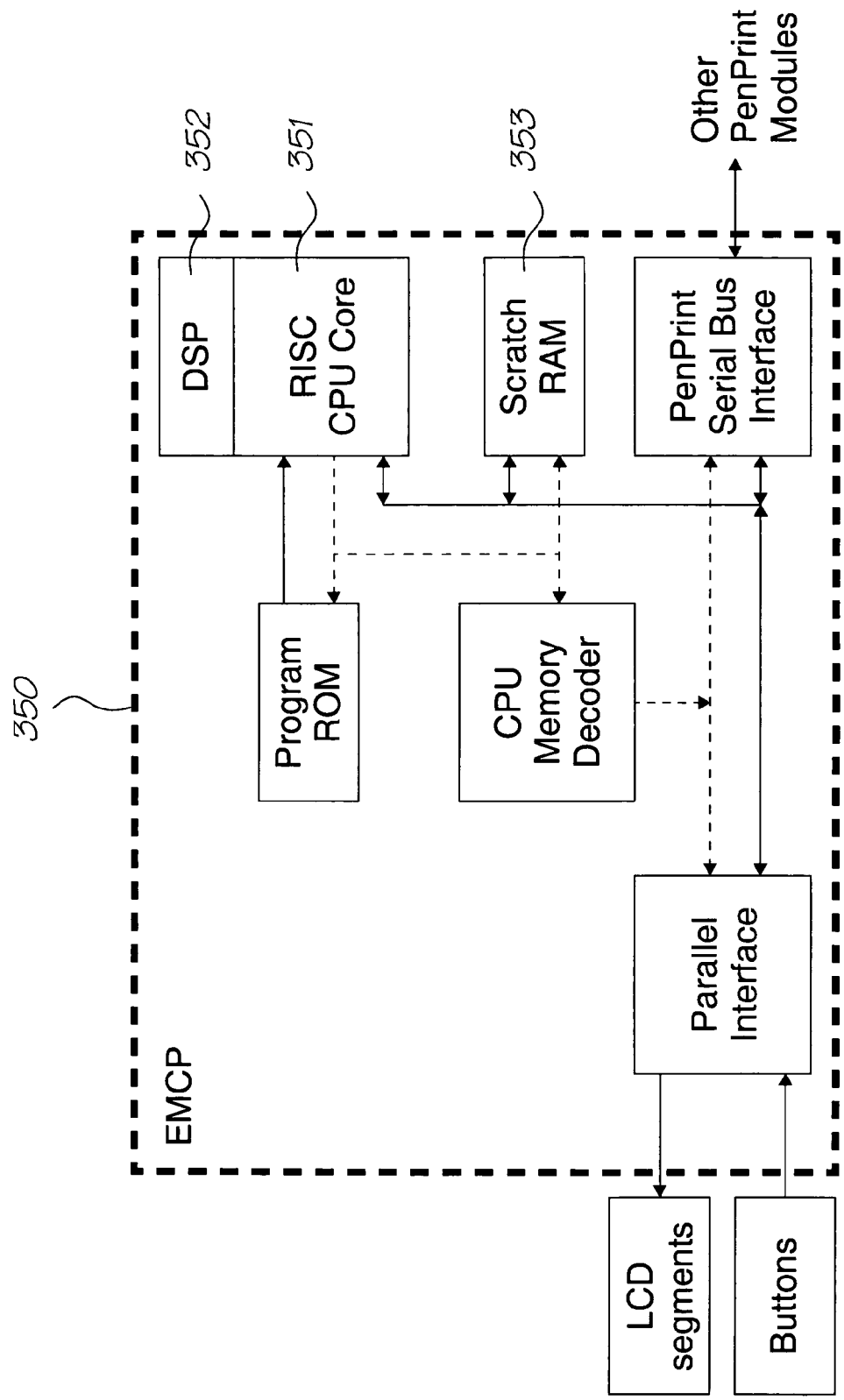
FIG. 17 is a block schematic diagram of the central processor for the effects module.

The elements of the Effects Module Central Processor (EMCP) are shown in FIG. 17. EMCP 350 is a single chip containing a standard RISC processor core 351 with DSP 352 for fast integer multiplication and a small memory, scratch RAM 353.

The software running on the EMCP is a limited subset of the VARK language and a lookup table of VARK scripts for image manipulation as described in co-pending United States Patent Applications whose USSNs are as follows:

| USSN | TITLE |
| --- | --- |
| 09/113,060 | Digital Instant Printing Camera with Image Processing Capability |
| 09/113,070 | Image Transformation Means Including User Interface |
| 09/112,777 | Producing Automatic "Painting" Effects in Images |
| 09/113,224 | Digital Image Warping System |
| 09/112,804 | Digital Image Region Detection Method and Apparatus |
| 09/112,805 | Brush Stroke Palette Feedback Method for Automatic Digital "Painting" Effects |
| 09/112,797 | Utilising of Brush Stroking Techniques in the Generation of Computer Images |
| 09/113,071 | Camera System with Computer Language Interpreter |
| 09/113,091 | Bump Map Compositing for Simulated Digital Painting Effects |
| 09/112,753 | Production of Artistic Effects in Images Utilising Restricted Gamut Spaces |
| 09/113,055 | Utilisation of Image Tiling Effects in Photographs |
| 09/113,057 | Utilisation of Image Texture Mapping in Photographs |

The subset of VARK includes compositing, convolving, filters, warps, color manipulation, tiling, and brushing. It does not include lighting effects. Since the effects are coupled with the VARK implementation, there is no specific future-proofing required.

The exact implementation will depend on the RISC processor chosen, although the clock speed is expected to be around the order of 48 MHz (a multiple of the Serial Bus speed of the compact printer system). Although VARK is processor independent, time-critical functions benefit from being specifically accelerated for a given processor. The following sections provide decomposition of an example set of VARK functions, complete with timings specific for image parameters in the compact printer system. The VARK language is described in the co-pending United States patent applications whose USSNs are listed in the preceding table, and a complete example of accelerating VARK for a specific CPU is described in co-pending U.S. patent application Ser. No. 09/113,060 entitled "Digital Instant Printing Camera with Image Processing Capability" and co-pending U.S. patent application Ser. No. 09/112,786 entitled "Digital Camera System Containing a VLIW Vector Processor".

The majority of Effects Module processing is simple compositing, involving the overlaying of a masked image over the background original stored image. Compositing is used to apply the borders, characters and captions effects of the Effects Module 80.

The process of compositing involves adding a foreground image to a background image using a matte or a channel to govern the appropriate proportions of background and foreground in the final image. Two styles of compositing are supported: regular compositing and associated compositing. The rules for the two styles are:

Regular composite: new value=Background+(Foreground−Background)α

Associated composite: new value=Foreground+(1−α) Background

The difference then, is that with associated compositing, the foreground has been pre-multiplied with the matte, while in regular compositing it has not. Note that the a channel has values from 0 to 255 corresponding to the range 0 to 1.

The compositing process is memory bound, requiring a maximum of 4 memory accesses for each pixel:
Read Alpha (α)
Read Background (stored image)
Read Foreground
Write Result When the α value is 0, the background is unchanged and the number of cycles to process the pixel is 1 (read α).

For a 850×534 pixel×3 color image, the total number of pixels is 1,361,700. At 4 cycles per pixel, the total number of cycles is 5,446,800.

If the resultant image is not stored locally, but instead transferred immediately to the Printer Module 10, the compositing process is less than a simplistic* 8 cycles per pixel transfer time, and can therefore be performed on-the-fly. It is absorbed in the transmission time and therefore effectively takes 0 seconds.

(*8 cycles is simplistic because it does not take any transmission overhead into account. For the transmission of 8 bits over the Serial Bus, a more likely transfer time is 10 cycles. However, if the process can be performed in fewer than 8 cycles, it can certainly be performed in less than 10 cycles.)

The process of convolving will now be described. A convolve is a weighted average around a center pixel. The average may be a simple sum, a sum of absolute values, the absolute value of a sum, or sums truncated at 0.

The image convolver is a general-purpose convolver, allowing a variety of functions to be implemented by varying the values within a variable-sized coefficient kernel. In this description, the kernel sizes supported are 3×3, 5×5 and 7×7 only.

The coefficient kernel is a table in DRAM. The kernel is arranged with coefficients in the same order as the pixels to be processed. Each table entry is an 8 bit coefficient.

The convolve process involves 9 reads and 1 write for a 3×3 convolve, 25 reads and 1 write for a 5×5 convolve, and 49 reads and 1 write for a 7×7 convolve. For building an image pyramid (as described later herein), a 3×3 convolve is all that is required.

The DSP allows a single cycle multiply/accumulate. The CPU must therefore generate the addresses (fixed offsets from each pixel location) and read the pixels from DRAM. This gives a minimum set of timings as shown in Table 1:

TABLE 1

Convolve Timings

| Kernel Size | Cycles per Pixel | Cycles per 850 × 534 Image | Cycles per 3-color Image |
| --- | --- | --- | --- |
| 3 × 3 | 10 | 4,539,000 | 13,617,000 |
| 5 × 5 | 26 | 11,801,400 | 35,404,200 |
| 7 × 7 | 50 | 22,695,000 | 68,085,000 |

It is often desirable to transform an image in terms of color. Simple color effects include removal of color to produce a grey-scale image or a sepia tone image. More complex effects include exaggeration of certain colors, substitution of one color for another and the like.

One of the simplest ways to transform the color of a pixel is to encode an arbitrarily complex transform function into a lookup table. The component color value of the pixel is used to lookup the new component value of the pixel. For each pixel read from the image, its new value is read from the lookup table, and written back to the image.

The input image is in the L*a*b* color space, with the luminance channel separated from the chrominance channels. The L*a*b* color space is particularly conducive to good use of replacement of color. Examples include desaturation for grey-scale (leaving L* alone and making a* and b* constant), brightening or darkening of an image, exaggeration of particular colors and the like.

If the lookup table starts at an appropriate address, the whole process takes 3 cycles per pixel: one to read the old value, one to read the new value from the lookup table, and one to write the new value back to the image. The lookup table required is 256 bytes.

For a 850×534 pixel×3 color image, the total number of pixels is 1,361,700. At 3 cycles per pixel, the total number of cycles is 4,085,100. The 3 lookup tables consume a total of 768 bytes.

If the resultant image is not stored locally, but instead transferred immediately to the Printer Module, the compositing process is less than a simplistic 8 cycles per pixel transfer time, and can therefore be performed on-the-fly. It is absorbed in the transmission time and therefore effectively takes 0 seconds.

Rather than perform arbitrarily complex color transformations exhaustively, excellent results can be obtained via a tri-linear conversion based on 3 sets of 3D lookup tables. The lookup tables contain the resultant transformations for the specific entry as indexed by L*a*b*. Three tables are required: one mapping L*a*b* to the new L*, one mapping L*a*b* to the new a*, and one mapping L*a*b* to the new b*.

The size of the lookup table required depends on the linearity of the transformation. The recommended size for each table in this application is 17×17×17, with each entry 8 bits. A 17×17×17 table is 4913 bytes (less than 5 KB).

Although a 17×17×17 table will give excellent results, it is envisaged that a 9×9×9 conversion table (729 bytes) may be sufficient. The exact size can be determined by simulation. The 5 KB conservative-but-definite-results approach was chosen for the purposes of this example.

To index into the 17-per-dimension tables, the 8-bit input color components are treated as fixed-point numbers (4:4). The 4 bits of integer give the index, and the 4 bits of fraction are used for interpolation.

For those entries not included in the tables, tri-linear interpolation can be used to give the final result. Tri-linear interpolation requires reading 8 values from the lookup table, and performing 7 linear interpolations (4 in the first dimension, 2 in the second, and 1 in the third). High precision can be used for the intermediate values, although the output value is only 8 bits.

Tri-linear interpolation takes 11 cycles. Table reading can occur concurrently and takes 8 cycles. Likewise, the 1 cycle output pixel write can occur concurrently. Note that this 11 cycle time must occur once for each color, thereby totaling 33 cycles. For a 3 color 850×534 pixel image, the elapsed time is 44,936,100 cycles.

For a 48 MHz processor, the entire color conversion process takes 0.93 seconds.

Several functions, such as warping, tiling and brushing, require the average value of a given area of pixels. Rather than calculate the value for each area given, these functions make use of an image pyramid. An image pyramid is effectively a multi-resolution pixel-map. The original image is a 1:1 representation. Sub-sampling by 2:1 in each dimension produces an image ¼ the original size. This process continues until the entire image is represented by a single pixel.

An image pyramid is constructed from an original image, and consumes ⅓ of the size taken up by the original image (¼+ 1/16+ 1/64+ . . . ). For an original image of 850×534 the corresponding image pyramid is approximately ½ MB.

The image pyramid is constructed via a 3×3 convolve performed on 1 in 4 input image pixels (advance center of convolve kernel by 2 pixels each dimension). A 3×3 convolve results in higher accuracy than simply averaging 4 pixels, and has the added advantage that coordinates on different pyramid levels differ only by shifting 1 bit per level.

The construction of an entire pyramid relies on a software loop that calls the pyramid level construction function once for each level of the pyramid. Note that the start address of each level of the image pyramid should be on a 64-byte boundary to take advantage of addressing mode redundancy.

The timing to produce a level of the pyramid is that for a 3×3 as described previously herein. The standard timing is 10 cycles per output pixel. For this function, we are always outputting an image ¼ the size of the input image. Thus for a 850×534 image:

timing to produce level 1 of pyramid=10×425×267=1,134,750 cycles timing to produce level 2 of pyramid=10×213×134=285,420 cycles timing to produce level 3 of pyramid=10×107×67=71,690 cycles Etc.

The total time is 10/3 cycles per original image pixel. (The generated levels of the image pyramid total ⅓ of the original image size, and each pixel takes 10 cycles to be calculated). In the case of a 850×534 image the total is 1,513,000 cycles. Multiplying this number by 3 for the 3 color channels gives a total time of 4,539,000 cycles.

With a CPU operating frequency of 48 MHz, the timing is just less than 0.1 seconds.

The image warper of the EMCP performs several tasks in order to warp an image:

Construct image pyramid

Scale the warp map to match the image size

Determine the span of input image pixels represented in each output pixel

Calculate the output pixel via tri-linear interpolation from the input image pyramid The construction of an image pyramid has already been described. The scaling of a warp map follows.

In a data driven warp, there is the need for a warp map that describes, for each output pixel, the center of the corresponding input image map. Instead of having a single warp map containing interleaved information, X and Y coordinates are treated as separate channels. Consequently there are two warp maps: an X warp map showing the warping of X coordinates, and a Y warp map, showing the warping of Y coordinates. The warp maps can have a different spatial resolution than the image they are scaling (for example a 32×20 warp map may adequately describe a warp for a 850×534 image). In addition, the warp maps can be represented by 8 or 16 bit values that correspond to the size of the image being warped.

There are several steps involved in producing points in the input image space from a given warp map:

Determine the corresponding position in the warp map for the output pixel

Fetch the values from the warp map for the next step (this can require scaling in the resolution domain if the warp map is only 8 bit values)

Bi-linear interpolation of the warp map to determine the actual value

Scaling the value to correspond to the input image domain

The first step can be accomplished by multiplying the current X/Y coordinate in the output image by a scale factor (which can be different in X & Y). For example, if the output image was 850×534, and the warp map was 85×54, we scale both X & Y by 1/10. This can also simply be accomplished by using the scale factors as simple deltas.

Fetching the values from the warp map requires access to 2 lookup tables. One lookup table indexes into the X warp-map, and the other indexes into the Y warp map. The lookup table either reads 8 or 16 bit entries from the lookup table.

The next step is to bi-linearly interpolate the looked-up warpmap values.

Finally the result from the bi-linear interpolation is scaled to place it in the same domain as the image to be warped. Thus, if the warp map range was 0–255, we scale X by 850/255, and Y by 534/255.

Table 2 lists the constants required for scaling a warp map:

TABLE 2

Constants Required for Scaling Warp Map

| Constant | Value |
|---|---|
| XScale | Scales 0–ImageWidth to 0–WarpmapWidth |
| YScale | Scales 0–ImageHeight to 0–WarpmapHeight |
| XRangeScale | Scales warpmap range (e.g. 0–255) to 0–ImageWidth |
| YRangeScale | Scales warpmap range (e.g. 0–255) to 0–ImageHeight |

Table 3 lists the lookup tables used:

TABLE 3

Warpmap Lookups

| Lookup | Size |
|---|---|
| X Lookup | Warpmap width × Warpmap height |
| Y Lookup | Warpmap width × Warpmap height |

Given [X,Y] the 4 entries required for bi-linear interpolation are returned. Even if entries are only 8 bit, they are returned as 16 bit (high 8 bits=0).

Since we move along space in the output image, it is a simple matter to add XScale and YScale to the offset within the warpmaps. Transfer time is 4 entries at 16 bits per entry, with 16 bits transferred per cycle for a total of 4 cycles. This is done twice, once for each warpmap for a total of 8 cycles.

Note that all 3 colors are warped using the same warpmap, so the total warpmap calculation time is 8 cycles per output pixel. For a 850×534 pixel image, the elapsed time is 3,631,200 cycles.

The points from the warp map locate centers of pixel regions in the input image. The distance between the centers of the pixel regions indicates the size of the regions, and we approximate this distance via a span.

Figure 18:
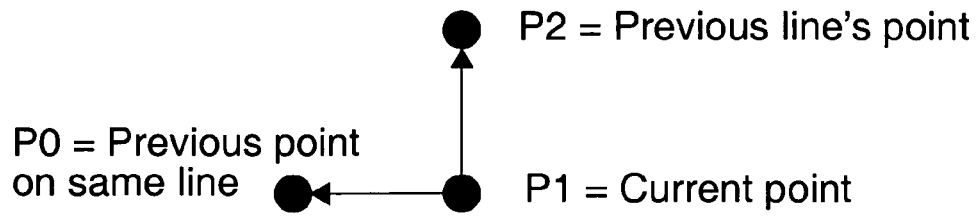
FIG. 18 is a schematic diagram illustrating pixel span calculation for a warping effect.

With reference to FIG. 18, take a given point in the warp map P1. The previous point on the same line is called P0, and the previous line's point at the same position is called P2. We determine the absolute distance in X & Y between P1 and P0, and between P1 and P2. The maximum distance in X or Y becomes the span—a square approximation of the actual shape.

Since we are processing the points in the sequential output order, P0 is the previous point on the same line, and P2 is the previous line's point (kept in a history buffer). P0, P1, and P2 are all 32 bit quantities.

P1 is placed in the history buffer, and taken out again at the same pixel on the following row as the new P2. Therefore 2 cycles are required: transfer of P2 from the buffer, and transfer of P1 to the buffer. The transfer of P1 to P0, normally a third cycle, can be masked by other activity. Since this must be done for both X and Y coordinates, the total time taken is 4 cycles.

A further 2 cycles are required for the subtraction and comparison. Since both coordinates must be subtracted and compared, this leads to 4 cycles, and a total of 8 (including history access).

Note that all 3 colors are warped using the same warpmap, so the total span calculation time is 8 cycles per output pixel. For a 850×534 pixel image, the elapsed time is 3,631,200 cycles.

We know the center and span of the area from the input image to be averaged, so the final part of the warp process is to determine the value of the output pixel. Since a single output pixel could theoretically be represented by the entire input image, it is potentially too time-consuming to actually read and average the specific area of the input image. Instead, we approximate the pixel value by using an image pyramid of the input image. FIG. 18 shows the same point on two levels of an image pyramid.

Figure 19:
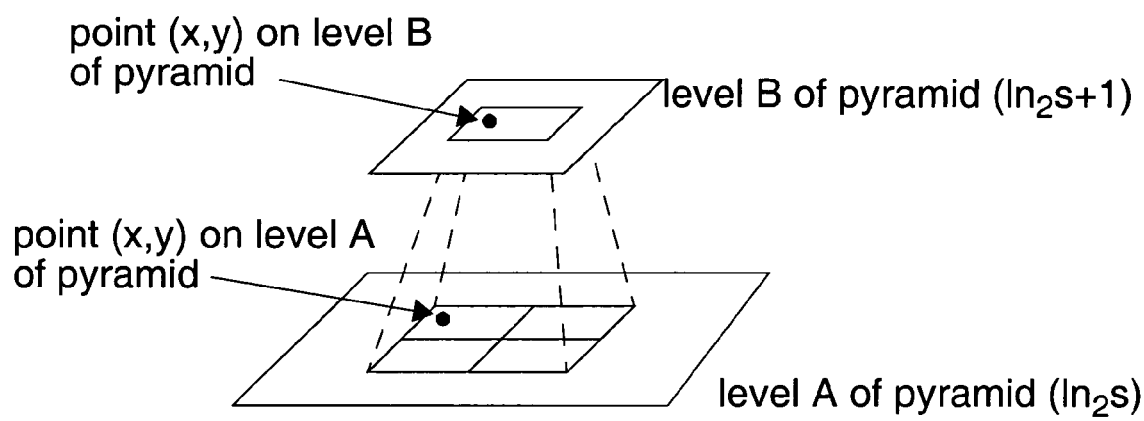
FIG. 19 is a schematic diagram representing a corresponding point on two levels of an image pyramid.
Figure 20:
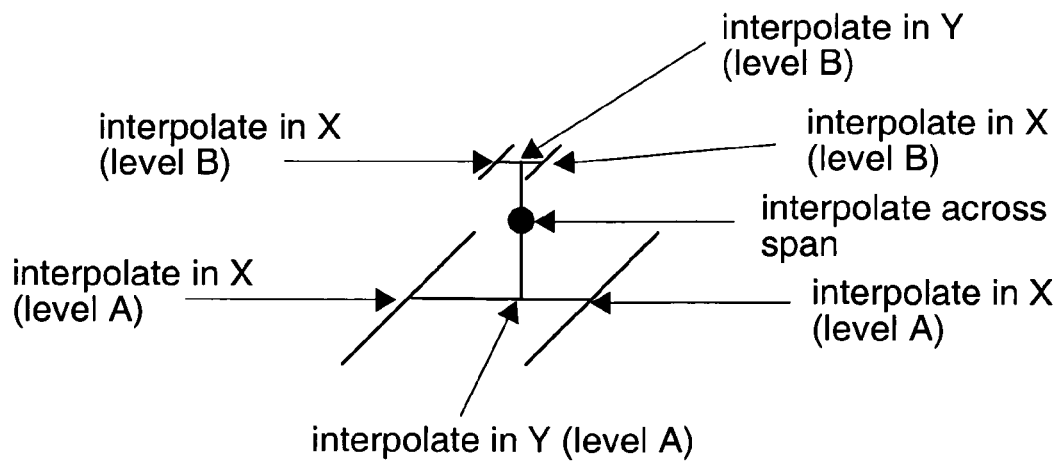
FIG. 20 is a schematic diagram representing tri-linear interpolation.

If the span is 1 or less, we only need to read the original image's pixels around the given coordinate, and perform bi-linear interpolation. If the span is greater than 1, we must read two appropriate levels of the image pyramid and perform tri-linear interpolation, as shown in FIG. 19. Performing linear interpolation between two levels of the image pyramid is not strictly correct, but gives acceptable results (it errs on the side of blurring the resultant image).

Generally speaking, for a given span s, we need to read image pyramid levels given by ln2s and ln2s+1. Ln2s is simply decoding the highest set bit of s. We must bi-linear interpolate to determine the value for the pixel value on each of the two levels of the pyramid, and then interpolate between them.

Tri-linear interpolation takes 11 cycles. Image pyramid transfer time can occur concurrently and takes 8 cycles. Likewise, the 1 cycle output pixel write can occur concurrently. Note that this 11 cycle time must occur once for each color, thereby totaling 33 cycles. For a 3 color 850×534 pixel image, the elapsed time is 44,936,100 cycles.

The entire warp process is summarized in Table 4 below:

TABLE 4

Warp Steps and Timings

| Step | Base Timing | Total Timing for 3 color 850 × 534 image |
|---|---|---|
| Construct image pyramid | 10/3 cycles per output pixel color component | 4,539,000 cycles |
| Scale warpmap | 8 cycles per output pixel | 3,631,200 cycles |
| Calculate span | 8 cycles per output pixel | 3,631,200 cycles |
| Calculate output pixel | 11 cycles per output pixel color component | 44,936,100 cycles |
| TOTAL | | 56,737,500 cycles |

At a processor speed of 48 MHz, the time taken to warp a 3 color image is 1.18 seconds.

ROM requirements for warping are directly related to the size of the warp maps, which in turn depend on the warp complexity. For simple warps, a warpmap size of 9 KBytes is sufficient (85×54×2 coordinates×8-bit components). For more complex warps, a warpmap size of 73 KBytes is required (170×108×2 coordinates×16-bit components).

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. An effects module for a modular camera and printer assembly comprises
 a body that houses processing circuitry that comprises
  a central processing core;
  memory circuitry connected to the core; and
  user interface circuitry connected to the core to facilitate operation of the module;
 module interface circuitry to permit communication between the central processing core and other modules of the camera and printer assembly; and a connector arranged on the body and connected to the module interface circuitry to permit the effects module to be connected to said other modules.

2. An effects module as claimed in claim 1, in which the central processing core is a RISC processor with a DSP for fast integer multiplication.

3. An effects module as claimed in claim 1, in which the memory circuitry includes a program ROM in which VARK language software for execution by the processing core is stored.

4. An effects module as claimed in 3, in which the VARK language software stored in the program ROM is configured to carry out at least a compositing function on image data received by the module.

5. An effects module as claimed in claim 1, which includes a RAM scratch memory that cooperates with the processor core.

6. An effects module as claimed in claim 1, in which the module interface circuitry is in the form of serial bus interface circuitry.

7. An effects module as claimed in claim 1, in which the user interface circuitry is parallel interface circuitry.

* * * * *